(12) United States Patent
Kelley et al.

(10) Patent No.: US 7,294,427 B2
(45) Date of Patent: Nov. 13, 2007

(54) MANIFOLD GASKET ACCOMMODATING DIFFERENTIAL MOVEMENT OF FUEL CELL STACK

(75) Inventors: Dana A. Kelley, New Milford, CT (US); Mohammad Farooque, Danbury, CT (US)

(73) Assignees: FuelCell Energy, Inc., Danbury, CT (US); United States of America Department of Energy, Washington, DC (US)

( * ) Notice: Subject to any disclaimer, the term of this patent is extended or adjusted under 35 U.S.C. 154(b) by 197 days.

(21) Appl. No.: 11/022,977

(22) Filed: Dec. 27, 2004

(65) Prior Publication Data

US 2006/0141324 A1 Jun. 29, 2006

(51) Int. Cl.
*H01M 2/08* (2006.01)
*F16J 15/02* (2006.01)

(52) U.S. Cl. .......................................... 429/35; 277/654
(58) Field of Classification Search .................. 429/34, 429/35, 36
See application file for complete search history.

(56) References Cited

U.S. PATENT DOCUMENTS

| | | | |
|---|---|---|---|
| 4,414,294 A * | 11/1983 | Guthrie | 429/35 |
| 4,467,018 A | 8/1984 | Schroll | |
| 4,514,475 A | 4/1985 | Mientek | |
| 4,643,954 A | 2/1987 | Smith | |
| 4,761,348 A | 8/1988 | Kunz et al. | |
| 5,110,692 A | 5/1992 | Farooque et al. | |
| 5,399,438 A | 3/1995 | Tateishi et al. | |
| 5,773,161 A | 6/1998 | Farooque et al. | |
| 6,461,756 B1 | 10/2002 | Blanchet et al. | |
| 6,514,636 B2 | 2/2003 | Li et al. | |
| 6,531,237 B2 * | 3/2003 | Kelley et al. | 429/35 |
| 2003/0124409 A1 | 7/2003 | Cramer et al. | |
| 2005/0019644 A1 | 1/2005 | Farooque et al. | |

OTHER PUBLICATIONS

U.S. Appl. No. 11/020,592, filed Dec. 23, 2004, Hansell et al.

* cited by examiner

*Primary Examiner*—Jonathan Crepeau
*Assistant Examiner*—Robert Hodge
(74) *Attorney, Agent, or Firm*—Cowan, Liebowitz & Latman, P.C.

(57) ABSTRACT

A gasket for use in a fuel cell system having at least one externally manifolded fuel cell stack, for sealing the manifold edge and the stack face. In accordance with the present invention, the gasket accommodates differential movement between the stack and manifold by promoting slippage at interfaces between the gasket and the dielectric and between the gasket and the stack face.

24 Claims, 5 Drawing Sheets

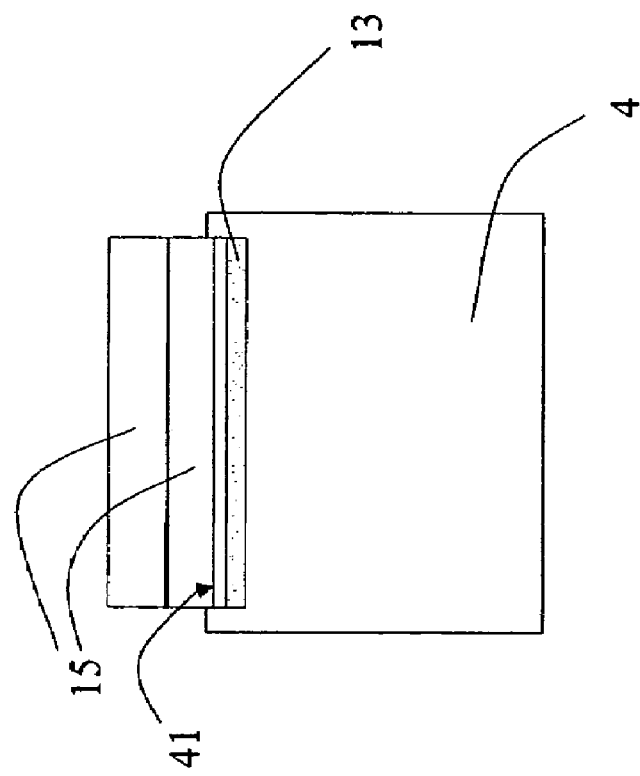
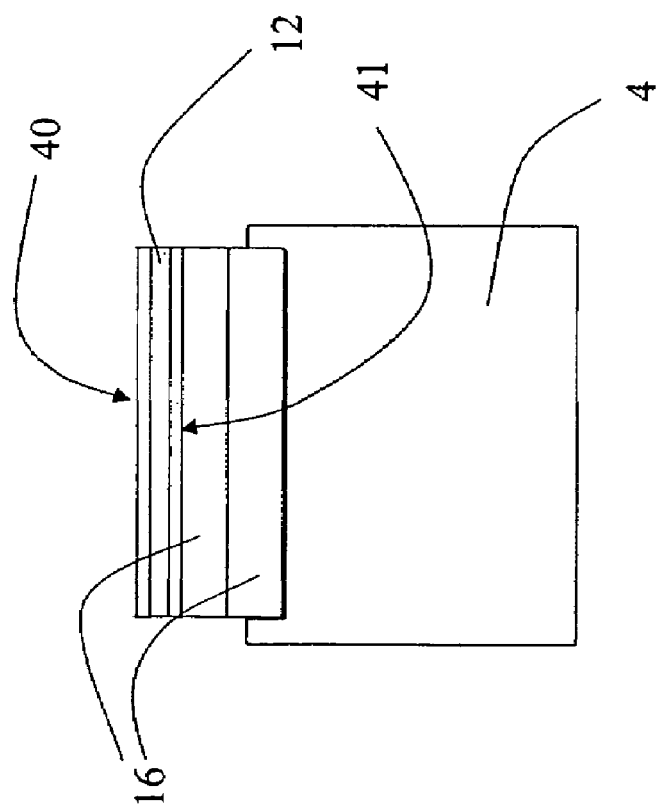
FIG. 5A
FIG. 5B

MANIFOLD GASKET ACCOMMODATING DIFFERENTIAL MOVEMENT OF FUEL CELL STACK

STATEMENT AS TO RIGHTS TO INVENTIONS MADE UNDER FEDERALLY SPONSORED RESEARCH AND DEVELOPMENT

This invention was made with Government support under contract DE-FC21-95MC31184 awarded by the Department of Energy. The Government has certian rights in the invention.

BACKGROUND OF THE INVENTION

1. Field of the Invention

This invention relates to fuel cell systems with at least one fuel cell stack and an external manifold and, in particular, to a gasket for use in a fuel cell system having at least one externally manifolded fuel cell stack. More particularly, the invention comprises an gasket that seals the manifold to the stack and accommodates differential movement between the stack and the manifold by allowing slippage at interfaces between them.

2. Description of the Related Art

A fuel cell is a device that directly converts chemical energy in the form of a fuel into electrical energy by way of an electrochemical reaction. In general, like a battery, a fuel cell includes a negative electrode or anode and a positive electrode or cathode separated by an electrolyte that serves to conduct electrically charged ions between them. In contrast to a battery, however, a fuel cell will continue to produce electric power as long as fuel and oxidant are supplied to the anode and cathode, respectively.

In order to produce a useful amount of power, individual fuel cells are typically arranged in stacked relationship in series with an electrically conductive separator plate between each cell. A fuel cell stack may be categorized as an internally manifolded stack or an externally manifolded stack. In an internally manifolded stack, gas passages for delivering fuel and oxidant are built into the fuel cell plates themselves. In an externally manifolded stack, the fuel cell plates are left open on their ends and gas is delivered by way of manifolds or pans sealed to the respective faces of the fuel cell stack. The manifolds provide sealed passages for delivering fuel and oxidant gases to the fuel cells and preventing those gases from leaking either to the environment or to the other manifolds. In some fuel cell stack arrangements, the stack is placed in an enclosure and the enclosure environment represents one of the process gases. In such a system, at least three manifolds are required to provide inlet and outlet gas passages for the stack, each of which must be sealed to the stack. In any case, the manifolds must perform the above functions under the conditions required for operation of the fuel cell stack and for the duration of its life.

An important aspect of the performance of an externally manifolded fuel cell stack is the seal established between the manifold edge and the stack face. The manifolds, which are constructed from metal, must be electrically isolated from the stack face, which is typically electrically conductive and has an electrical potential gradient along its length. Dielectric insulators are used between the metallic manifold and the fuel cell stack to electrically isolate the manifold from the stack and to prevent the manifolds from shorting the stack.

A fuel cell stack will usually shrink over its life as fuel cell components creep and densify at high temperature and pressure. Such shrinkage and changes in fuel cell stack dimensions create stresses on the manifold assembly during stack operation. In particular, vertical stack dimensions may change by as many as 2-3 inches in a stack of 300 or more fuel cells. As the stack changes in vertical dimension, it requires the seal between the dielectric insulators in the manifold assembly and the stack face to accommodate movement along the end plates at the top and bottom of the stack. Differences in coefficients of friction between the dielectric and the seal and between the seal and stack face apply additional stress to the seal and may cause it to wear during stack operation and eventually fail. Therefore, there is a need for a manifold-stack seal that is better able to accommodate such dimensional changes while maintaining a gas seal and electrical isolation of the manifold from the stack.

The dielectric insulators, which are typically made from brittle ceramic materials such as alumina and mica, may be easily damaged by thermal and mechanical stresses applied on the manifold system during fuel cell stack operation. In order to withstand the stresses imparted on the manifold system while maintaining electrical isolation between the manifold and the stack, improvements have been made to the manifolds and to the dielectric insulators used to isolate them from the stack.

For example, a common dielectric insulator assembly is designed as a rectangular frame with joints that allow for differential movement between the stack and manifold. Such a construction is shown and described in U.S. Pat. No. 4,414,294 which discloses a rectangular insulator frame having a plurality of segments interconnected by slidable spline joints that permit expansion or contraction with the walls of the manifold and the fuel cell stack. In order to withstand stresses caused by differential movement of the fuel cell stack, the dielectric frames may be made from high-density ceramics. However, manifold compression against the stack face and stack compaction during operation of the fuel cell stack cause mechanical stresses which are not completely accommodated by the ceramic dielectrics and may still damage them. There is thus a need for a manifold-stack seal that is better able to accommodate such thermal and mechanical stresses and prevent the ceramic dielectrics from breaking.

In some contemporary manifold systems, the manifold assembly is compressed against the stack so that the seal between the manifold and stack is maintained when changes in the stack dimensions occur. One such stack manifold compression assembly is shown and described in U.S. Pat. No. 4,467,018 which discloses external reactant manifolds strapped or clamped to the fuel cell stack. U.S. Pat. No. 6,461,756 describes a retention system for maintaining external manifolds in sealing relationship to the fuel cell stack. A flexible manifold system that conforms to the stack shape and accommodates stack movement during operation is described in co-pending U.S. patent application Ser. No. 10/264,866, filed Oct. 4, 2002, assigned to the same assignee hereof.

In addition, various other components of the fuel cell stack and manifold sealing assembly have been further improved to address the limitations of the seal between the manifold and stack. For example, improved designs of bipolar separator plates in fuel cells, which provide flat sealing surfaces for the dielectric frame and gasket, are described in several patents, including U.S. Pat. No. 4,514,475 which teaches a fuel cell separator plate that can adjust to changes in thickness of cell parts during use; U.S. Pat. No. 5,399,438 which teaches a stainless steel member with high corrosion resistance; and U.S. Pat. No. 5,773,161 which teaches an improved bipolar separator structure that assists in electrolyte management by providing trough areas for dispersal or absorption of electrolyte. A gasket design to accommodate the growth of the bipolar plates over time during operation of the fuel cell stack is described in co-pending U.S. patent application Ser. No. 10/627,035, filed Jul. 25, 2003 and also assigned to the same assignee hereof. Particularly, a compressible gasket and dielectric gasket provide a seal between the dielectric and the manifold. The compressible gasket additionally provides a compliant member embedded therein that conforms the gasket to the dielectric joints and manifold irregularities. The ceramic dielectric frame described in co-pending U.S. patent application Ser. No. 11/020,592 filed Dec. 23, 2004 and assigned to the same assignee hereof, enhances dielectric isolation and comprises an interlocking arrangement that reduces mechanical stresses and prevents wear on the abutting gaskets. However, these improvements in the manifold assembly, fuel cell stack components, and dielectric insulator construction do not address the differences in coefficients of friction at the interfaces between the dielectrics and the seal and between the seal and stack face and the resulting wear on the manifold gasket.

Another consideration is that fuel cells operate at very high temperatures. For example, molten carbonate fuel cells operate at about 650° Celsius. The selection of materials to be used in the manifold gasket must account for this long term operating temperature and allow the components to last for the life of the fuel cell stack, which is typically several years. There is therefore a need for a manifold seal that tolerates fuel cell stack operating temperatures and can accommodate stack movement and changes in stack dimensions.

Another limitation of the seal between the dielectric insulator and the stack face is that it may permit undesirable movement of electrolyte from the top or positive end of the fuel cell stack to the bottom or negative end of the stack, which would flood the cells at the negative end of the stack and deplete electrolyte in cells at the positive end. The gasket may also permit electrolyte migration from the stack across the dielectric to the manifold. Methods and devices for reducing or mitigating electrolyte migration in fuel cell systems have been discussed in U.S. Pat. No. 4,643,954 which discloses a passageway along the height of a fuel cell stack with electrolyte wettable wicking material at opposite ends thereof, which equalizes molten electrolyte content throughout the stack; U.S. Pat. No. 4,761,348 which teaches an electrolytic fuel cell stack having a combination of inactive electrolyte reservoirs at the upper and lower end portions that mitigate the ill effects of electrolyte migration, and a porous sealing member with low electrolyte retention that limits electrolyte migration; and U.S. Pat. No. 5,110,692 which teaches a manifold gasket for molten carbonate fuel cells having an elongated porous member that supports electrolyte flow and barrier means for retarding such flow, for controlling electrolyte flow and reducing electrolyte migration. Highly polished ceramics, such as those described in U.S. Pat. No. 6,514,636, are also desirable for providing the required voltage isolation by preventing or reducing electrolyte creep over the surface of the frame.

It is therefore an object of the invention to provide a fuel cell manifold sealing assembly including a gasket for sealing a manifold to the face of a molten carbonate fuel cell stack that accommodates differential movements resulting from thermal stresses and internal fuel cell compactions during operation of the fuel cell stack, while maintaining a gas seal between the manifold and stack and keeping the manifold electrically isolated from the stack.

It is a further object of the invention to provide a gasket that accommodates differential movement at the interfaces between a manifold and fuel cell stack and reduces stresses on the dielectric insulator component of the gasket assembly.

It is yet another object of the invention to provide a gasket that accommodates differential movement at the interfaces between the manifold and fuel cell stack while limiting electrolyte migration.

SUMMARY OF THE INVENTION

In accordance with the principles of the present invention, the above and other objectives are realized in a gasket between the manifold edge and the stack face in a fuel cell system having at least one externally manifolded fuel cell stack. The gasket accommodates differential movement between the stack and manifold by promoting slippage at interfaces between the gasket and the dielectric and between the gasket and the stack face.

As described above with respect to conventional manifold gasket seals, the gasket or seal limits the stresses applied to the dielectric during fuel cell stack operation. Conversely, the dielectric prevents deterioration of the gasket, which moves over joints in the ceramic dielectric and over fuel cell stack end plates, allowing differential movement between the manifold and stack. Particularly, the gasket adheres to the stack in the cell area, and a slip plane exists between the dielectric frame and the gasket. At one or more ends of the stack, a slip plane also exists between the end plate and the gasket. According to the present invention, a gasket assembly promotes slippage in these slip planes.

BRIEF DESCRIPTION OF THE DRAWINGS

The above and other features and aspects of the present invention will become more apparent upon reading the following detailed description in conjunction with the accompanying drawings, in which:

FIG. 5A is a further detailed view of the cross-sectional view shown in FIG. 3A; and FIG. 5B is a further detailed view of the cross-sectional view shown in FIG. 3B.

DETAILED DESCRIPTION

The present invention provides a gasket or seal that accommodates the changes in shape and dimension of a fuel cell stack that occur during stack life and the differential movements that result from such physical changes. These movements may be categorized as thermal movements, which occur during heating or cooling or result from operational variations, and internal cell compaction movements, which occur during the initial conditioning and longer-term creep of the components. The gasket described in detail below allows both types of movements and thus minimizes stresses imparted on the dielectric insulators.

In particular, the gasket limits stresses caused by the differences in coefficients of expansion between the manifold assembly and stack components. The materials described were evaluated and selected from tests that simulate relative movements between adjacent surfaces in contact at fuel cell operating conditions. A major consideration in the development of the gasket was the minimization of stresses transferred to the ceramic dielectric as the stack heats, cools, or compacts.

The features of the manifold gasket will be described in reference to a fuel cell stack in which the manifold and stack are fixed at one end. With movement constrained at one end of the stack, maximum movement between the manifold assembly and stack occurs at the opposite end, which better illustrates the properties of the gasket. However, the gasket presented and described herein is not limited to use with a fuel cell stack so constrained, and may be applicable to a manifold system for other stack arrangements including one that is not fixed at one end.

Figure 1:
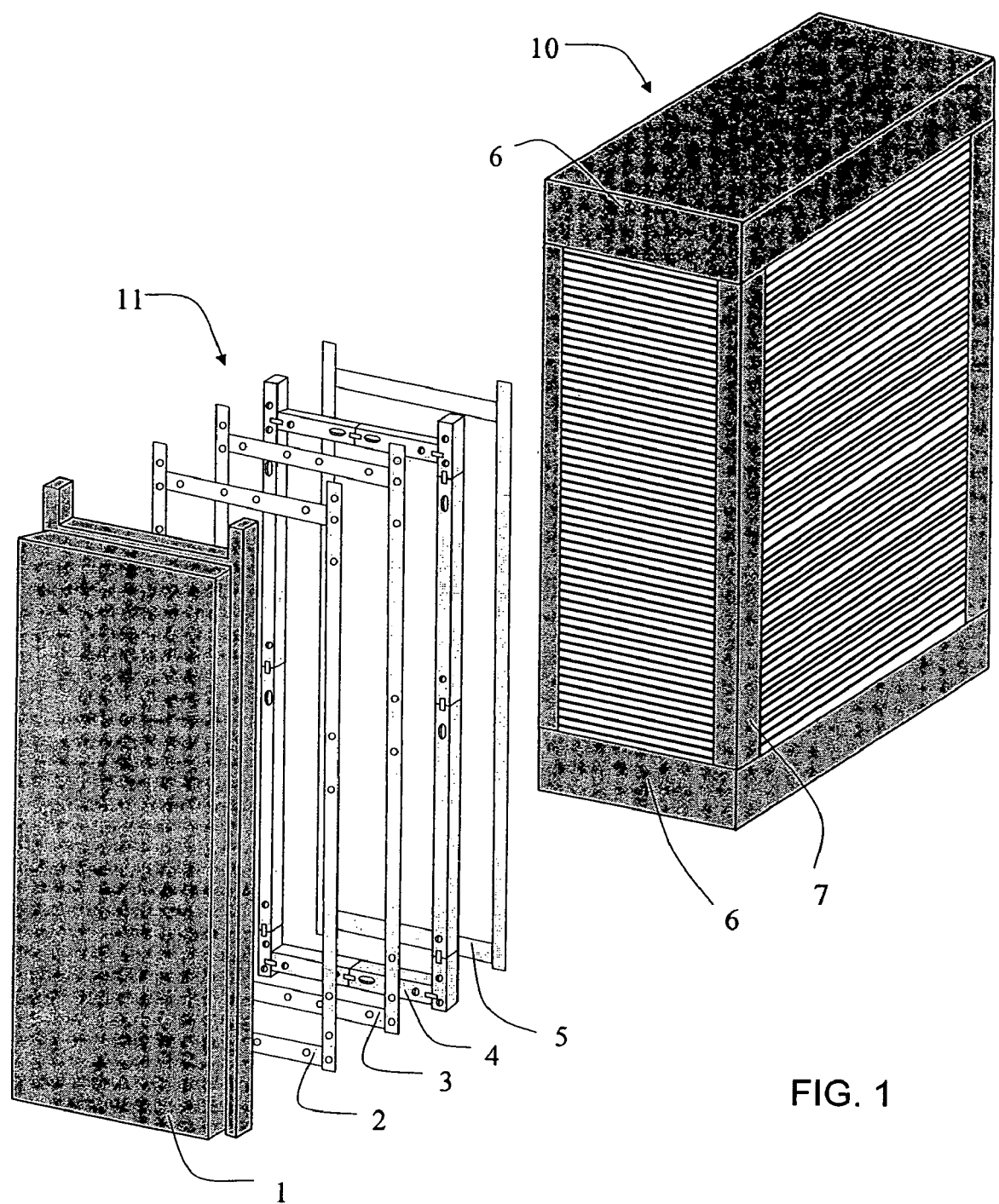
FIG. 1 is an exploded view of the manifold sealing assembly, including a gasket in accordance with the present invention, at the beginning of stack life.

FIG. 1 is an exploded view of the manifold sealing assembly 11 including a gasket 5 in accordance with the present invention. The manifold sealing assembly 11 is shown adjacent a fuel cell stack 10 at the beginning of stack life ("BOL"). The components of the manifold seal assembly 11 in accordance with the invention include a manifold 1, dry dielectric 2, compressible gasket 3, ceramic dielectric insulator 4, and gasket 5. The manifold sealing assembly 11 is sealed to the stack face at the solid surfaces of the end plates 6 and along the stack edges 7. As previously noted and described in further detail below, slippage is required between the stack 10 and the ceramic dielectric 4 and is accommodated by the gasket 5 of the present invention.

In the manifold gasket assembly shown in FIG. 1, the dielectric insulator 4 is separated from the manifold 1 by a dry dielectric 2 and compressible gasket 3. The dry dielectric 2 is made of ceramic material such as phlogopite mica, and it serves the function of further electrically isolating the manifold from the stack. Compressible gasket 3 is disposed between the dry dielectric 2 and the dielectric insulator 4. As discussed above with regard to improvements made to manifold assembly components to accommodate differential stack movement, the gasket 3 is made from layers of a compressible ceramic felt, e.g., zirconia felt, alumina felt, or similar compressible fibrous material, and may have a resilient member embedded therein to further accommodate changes in the stack dimensions.

The gasket 5 is disposed on the opposite side of the dielectric insulator 4, between the dielectric insulator 4 and the stack 10. The gasket 5 is made from a fibrous ceramic material such as zirconia felt ZTF100 from Zircar Zirconia, Inc. and comprises one or more layers, as described in further detail below. The embodiment of the manifold assembly 11 shown in FIG. 1, when assembled and attached to the fuel cell stack 10, is fixed at the lower end to better illustrate the accommodation of differential movement during operation of the fuel cell stack by the gasket 5 that is the subject of the present invention.

Figure 2:
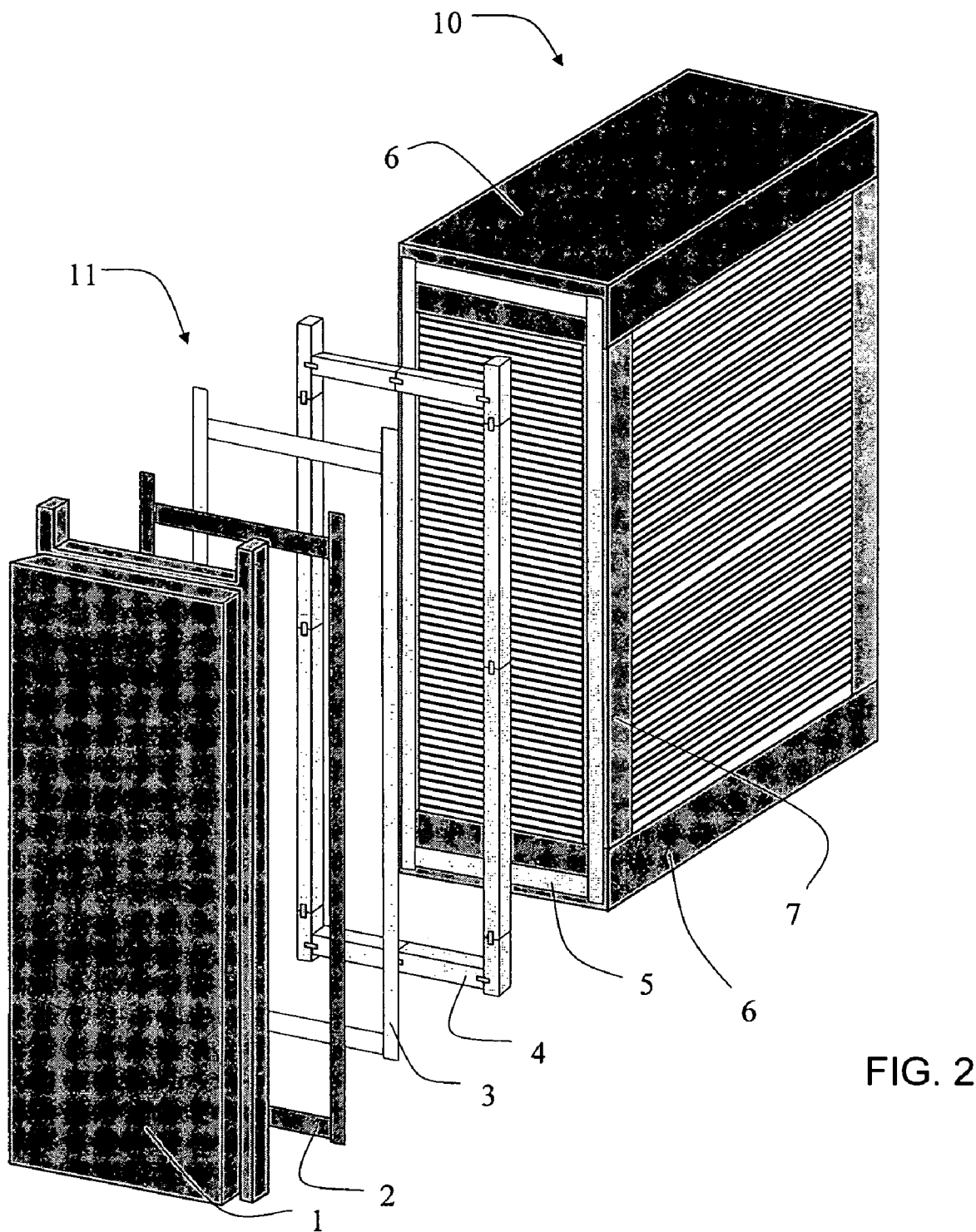
FIG. 2 is an exploded view of the manifold sealing assembly, including the gasket in accordance with the present invention, at the end of stack life.

FIG. 2 is an exploded view of a manifold sealing assembly 11, including the gasket 5 and adjacent a fuel cell stack 10 at the end of stack life ("EOL"). As compared with the condition of these components at the stack BOL shown in FIG. 1, and particularly with respect to its gasket member 5, slippage has occurred between the stack 10 and the ceramic dielectric 4 during operation of the stack. The slippage between the stack and dielectric has been promoted by the gasket 5 of the present invention. Such feature is shown and described in further detail below with respect to FIGS. 3, 3A, 3B and 4.

Figure 3A:
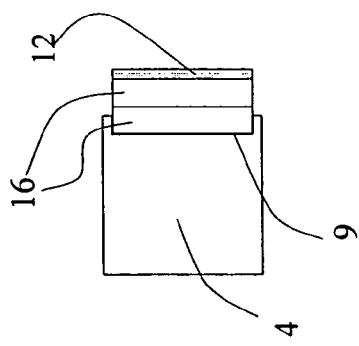
FIG. 3A is a cross-sectional view of the gasket shown in FIG. 3 taken along line 3A-3A, showing the gasket captivated by the ceramic dielectric.
Figure 3:
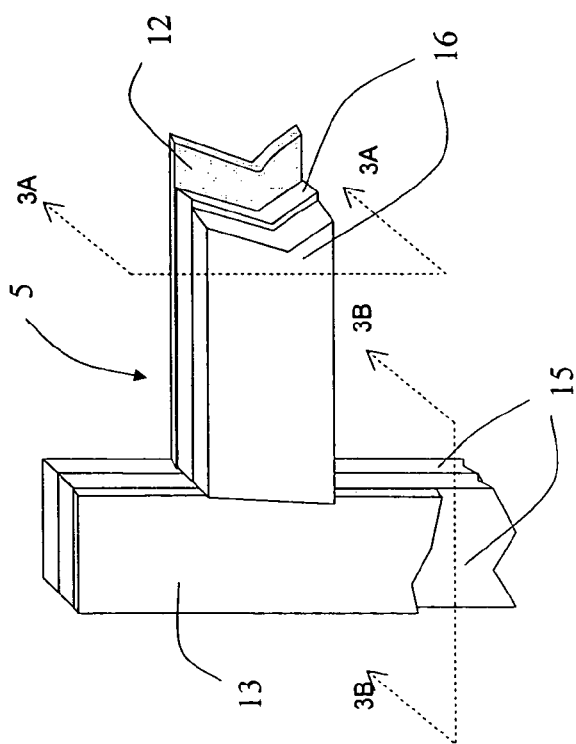
FIG. 3 is a detailed schematic view of a portion of the gasket at the beginning of stack life.

FIG. 3 is a detailed schematic view of a portion of the gasket 5 at the beginning of stack life. As shown, the gasket 5 comprises first and second sections 15, 16, each having two layers of ceramic felt material such as zirconia felt. It should be understood that the gasket may be made of any number of sections, each having one or more layers of ceramic felt material, and the gasket of the present invention is not limited to the embodiment and materials shown and described herein.

The first section 15 corresponds to the portion of the gasket 5 that is disposed adjacent the stack in the cell area. A slip plane exists between the dielectric frame (not shown) and the first section 15 because the gasket adheres to the stack in the cell area, where there is higher friction than between the gasket and dielectric. A layer of ceramic cloth 13 is disposed on the surface of the first section 15 of the gasket 5 that is adjacent the dielectric. The cloth 13 is typically an alumina cloth such as Nextel 610 manufactured by 3M, Inc. or similar ceramic cloth material that has a lower friction factor relative to the dielectric insulator than does the ceramic felt layer on which it is disposed, thereby promoting slippage at the interface between the ceramic cloth 13 and the dielectric insulator.

Second section 16 corresponds to the portion of the gasket 5 that is disposed adjacent the stack end plate. A slip plane exists between the end plate (not shown) and the second section 16, because this section of the gasket stays fixed to the dielectric insulator due to the higher coefficient of friction between the dielectric and gasket than between the gasket and end plate. Slippage between the dielectric and the second section 16 of the gasket is further limited if not entirely prevented because the gasket is captivated by the dielectric, as will be described in further detail below with respect to FIG. 3A.

A layer of ceramic cloth 12 is disposed on the surface of the gasket opposite ceramic cloth layer 13. Particularly, the ceramic cloth 12 is disposed on the surface of the second section 16 that is adjacent the end plate. Like the ceramic cloth 13 disposed on the first section 15 of the gasket, ceramic cloth layer 12 is also typically made of an alumina cloth or similar woven ceramic material. It has a lower friction factor relative to the end plate than does the ceramic felt layer on which it is disposed, thereby promoting slippage at the interface between the ceramic cloth 12 and end plate.

In addition, the surface of the stainless steel end plate (not shown in FIG. 3) may be aluminized to prevent corrosion. Corrosion of stainless steel over time increases surface roughness of the end plate and causes the friction factor between the end plate and gasket to increase. The aluminized surface limits corrosion, thereby improving slippage during operation of the fuel cell stack. The end plate surface is aluminized by adding a 1-3 mil coating of aluminum that diffuses into the stainless steel during heat treatment. The aluminized end plate provides an equivalent slip plane as compared to untreated stainless steel at the beginning of stack life or BOL.

To further promote slippage between the ceramic cloth 12 and the end plate, a coating of graphite may be applied to the cloth on a surface adjacent the end plate. The graphite coating lowers the coefficient of friction by at least a factor of two and further accommodates fast shrinkage during the stack BOL. The graphite coating burns off during the beginning of fuel cell stack operation. The graphite coating will be described in further detail with respect to FIG. 5A, below.

The ceramic cloth layers 12, 13 disposed on opposite surfaces of the gasket 5 are applied to the ceramic felt with an adhesive material such as temporary glue, which burns off soon after the stack begins operation and does not affect fuel cell stack performance. The ceramic cloth layers 12, 13 remain fixed to the ceramic felt to which they are applied after the adhesive burns off, while promoting slippage at their interfaces with the adjacent dielectric or end plate.

FIG. 3A is a cross-sectional view of the gasket 5 shown in FIG. 3 taken along line 3A-3A, showing the second section 16 of the gasket captivated by the ceramic dielectric 4. In particular, the dielectric 4 is formed with a groove 9 on the surface facing the gasket. The groove 9 formed in the dielectric 4 has the same width as the gasket, and has a depth so that at least a portion of one of the ceramic felt layers of the gasket is captivated in the groove 9. As shown, the captivation of a portion of the second section 16 of the gasket in the groove 9 of the dielectric 4 prevents the second section 16 from moving independently of the dielectric in a direction perpendicular to the length of the second section 16, or parallel to the height of the fuel cell stack. To further prevent section 16 from moving independently of the dielectric 6, a ceramic coating or bead can be applied to the gasket at its interface with the dielectric. Examples of materials that increase the friction between the dielectric and the gasket are zirconia rigidizer from Zircar Zirconia, Inc. and Cotronics Corporation's 989 ceramic cement.

Accordingly, when the portion of dielectric 4 shown in FIG. 3A moves in a direction parallel to the height of the fuel cell stack to accommodate stack shrinkage during operation, the second section 16 is only permitted to move with the dielectric in such direction relative to the end plate (not shown). This configuration of the dielectric and second section 16 of the gasket 5 thus promotes slippage between the alumina cloth 12 and the end plate.

Figure 3B:
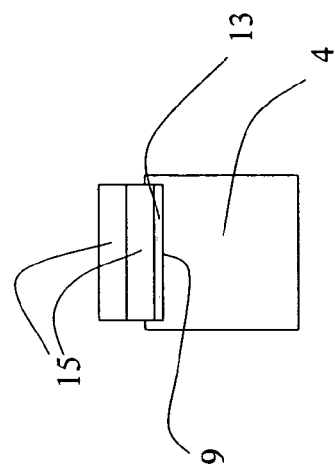
FIG. 3B is a cross-sectional view of the gasket shown in FIG. 3 taken along line 3B-3B, showing the gasket captivated by the ceramic dielectric.

FIG. 3B is a cross-sectional view of the gasket 5 shown in FIG. 3 taken along line 3B-3B, showing the first section 15 of the gasket captivated by the ceramic dielectric 4. Like the portion of the dielectric shown in FIG. 3A, the dielectric 4 shown in FIG. 3B is also formed with a groove 9 on the surface facing the gasket 5. The groove 9 formed in the dielectric 4 has the same width as the gasket, and has a depth so that the ceramic cloth layer 13 and at least a portion of one of the ceramic felt layers of the first section 15 of the gasket are captivated in the groove 9.

In this case, captivation of the gasket by the groove 9 formed in the dielectric insulator 4 does not prevent relative movement of and slippage between the dielectric and the first section 15 of the gasket in a direction parallel to the height of the fuel cell stack. Rather, as shown, the captivation of a portion of the first section 15 of the gasket in the groove 9 of the dielectric 4 encloses, but does not constrain, the slip plane between the ceramic cloth 13 and the dielectric 4 in a direction parallel to the length of the first section 15 and parallel to the height of the fuel cell stack. When the first section 15 of the gasket shown in FIG. 3B adheres to the stack cell area (not shown) and moves with the stack in a direction parallel to the height of the fuel cell stack as it shrinks during operation, the first section 15 will also move in such direction relative to the dielectric 4. This configuration of the dielectric and first section 15 of the gasket 5 thus promotes slippage between the alumina cloth 13 and the dielectric 4.

Figure 4:
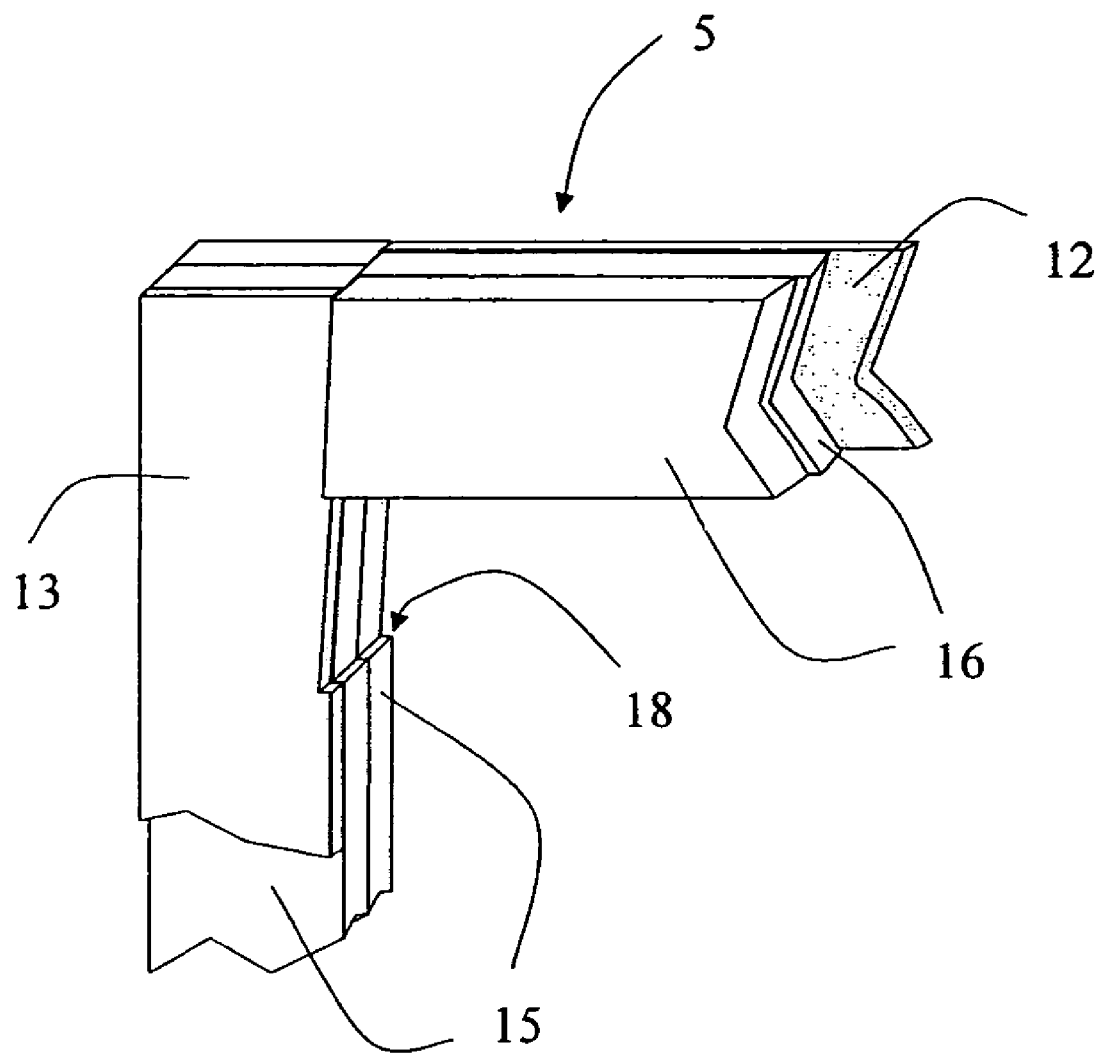
FIG. 4 is a detailed schematic view of the portion of the gasket shown in FIG. 3, at the end of stack life.

FIG. 4 is a detailed schematic view of the portion of the gasket 5 shown in FIG. 3 at the end of stack life (EOL). Although not readily apparent in FIG. 4, by the time of stack EOL the first section 15 of the gasket has moved relative to the dielectric (not shown) as shrinkage of the stack has occurred during stack operation. Particularly, the first section 15 has shortened in length, which is attributable to: the first section 15 of the gasket following the shrinkage of the stack during operation of the stack; one end of the first section 15 becoming shorter relative to the corresponding portion of the dielectric to which it is attached, since the stack and manifold assembly have been fixed at the opposite end; and the slippage promoted by the cloth layer 13 permitting movement of the first section 15 of the gasket relative to the dielectric in a direction parallel to the length of the first section 15 and parallel to the height of the fuel cell stack.

In addition, there has been movement of the end plate of the fuel cell stack (not shown) relative to second section 16 of the gasket. Particularly, as the stack shrinks during operation, the second section 16, which is captivated by the dielectric as shown in FIG. 3A, slips as the end plate moves in a direction perpendicular to the length of the second section 16 and parallel to the height of the fuel cell stack. This is attributable to: the shrinkage of the stack and differential movement between the stack and dielectric during operation of the stack; the gasket accommodating such differential movement by allowing slippage at the interface between the second section 16 and the end plate at one end of the stack, since the stack and manifold assembly have been fixed at the opposite end; and the slippage being promoted by the cloth layer 12 and further enhanced by a graphite coating.

In order to limit gas leakage during differential movement between the stack, gasket and dielectric from BOL to EOL, FIG. 4 shows a further modification of the gasket 5 of the invention in the form of an interference joint formed in the gasket. Particularly, an angled notch 18 is formed in a length of the inner side of each of the ceramic felt layers of the first section 15 of the gasket. Throughout most of the first section 15 of the gasket, i.e., below the notch 18 shown in FIG. 4, the ceramic felt layers have uniform width and dimension, but over a length of the section 15 from the notch 18 to the terminal end of the section, the width of the layers first decreases at the notch and then gradually increases, as shown in FIG. 4, so that the edge of the felt layers adjacent the second gasket section 16 is slightly angled or slanted. In addition, the end or edge of the ceramic felt layers of the second section 16 adjacent or abutting this angled length of the first section 15 are also slightly angled to follow the angle of and fit within the first section 15. At BOL, the second section 16 of the gasket rests on the notch (not shown). At EOL, as shown in FIG. 4, the second section 16 has moved relative to the first section 15 away from the notch 18. The interference joint thus maintains a snug fit between the first and second sections 15, 16 thereby preventing gas leakage.

FIGS. 5A and 5B are further detailed views of the cross-sectional view of the gasket 5 shown in FIGS. 3A and 3B with the graphite coating and rigidizer coatings shown. As can be seen in FIG. 5A, the graphite coating 40 is on the surface of ceramic cloth 12 which interfaces with the end plate. Such graphite coating accommodates fast shrinkage of the stack at BOL and improves initial slippage by acting as a lubricant that limits damage to the cloth. The coating 40 burns off after the first hundred hours of stack operation without affecting the performance of the ceramic cloth 12 or gasket.

In FIG. 5A, a ceramic rigidizer coating 41, such as zirconia rigidizer from Zircar Inc., is on the surface of the ceramic cloth layer 12 opposite the graphite coating 40, at the interface between the cloth layer 12 and the ceramic felt layer 16. This rigidizer coating 41 binds the fibers of the ceramic cloth 12 together and limits damage to the cloth during slippage against the end plate by strengthening the cloth. The rigidizer coating 41 is applied to the cloth 12 on the surface of the cloth adjacent the felt layer 16 in such a manner that it does not penetrate to the opposite surface of the cloth 12.

FIG. 5B shows the ceramic rigidizer coating 41 on the surface of the ceramic cloth layer 13 opposite the dielectric 4, at the interface between the cloth layer 13 and the ceramic felt layer 15. This ceramic coating 41 binds the fibers of the ceramic cloth 13 together and limits damage to the cloth during slippage against the dielectric by strengthening the cloth. With respect to application of the ceramic coating 41 to the cloth 13 on the surface of the cloth adjacent the felt layer 15, it is especially important that the coating 41 be applied such that it does not penetrate to the opposite surface of the cloth 13, because the coating 41 has a higher coefficient of friction than the untreated ceramic cloth 13.

In all cases it is understood that the above-described arrangements are merely illustrative of the many possible specific embodiments which represent applications of the present invention. Numerous and varied other arrangements, including use of different materials and various configurations of components of the manifold assembly, can be readily devised in accordance with the principles of the present invention without departing from the spirit and scope of the invention.

What is claimed is:

1. An assembly comprising:
   a gasket for sealing a manifold to a fuel cell stack, said gasket having first and second opposing outer surfaces, and a material promotive of slipping disposed on at least a portion of at least one of said first and second outer surfaces,
   wherein said gasket includes a fibrous ceramic layer, and said material comprises a ceramic cloth, and
   wherein said gasket is adapted to be disposed between the face of the fuel cell stack and a dielectric insulator, said dielectric insulator being disposed between the manifold and stack face;
   wherein the stack face comprises opposing first and second periphery portions formed by portions of the end faces of the end plates of the fuel cell stack, and opposing third and fourth periphery portions formed by portions of the end faces of the bipolar separator plates in the fuel cells of the fuel cell stack;
   wherein said dielectric insulator comprises opposing first and second frame portions adapted to be disposed adjacent to said first and second periphery portions of said stack face, and opposing third and fourth frame portions adapted to be disposed adjacent to said third and fourth periphery portions of said stack face; and
   wherein said first outer surface of said gasket is adapted to face said frame portions of said dielectric insulator and said second outer surface of said gasket is adapted to face said periphery portions of said stack face.

2. An assembly according to claim 1, wherein:
   said ceramic cloth is disposed on at least a portion of said first outer surface of said gasket, said portion of said first outer surface being adapted to face said third and fourth frame portions of said dielectric insulator, and on at least a portion of said second outer surface of said gasket, said portion of said second outer surface being adapted to face said first and second periphery portions of said stack face.

3. An assembly in accordance with claim 2, further comprising:
   one or more of said dielectric insulator, said manifold and said stack.

4. An assembly according to claim 2, wherein said fibrous ceramic layer comprises at least one layer of zirconia felt.

5. An assembly according to claim 4, wherein said ceramic cloth is alumina cloth.

6. An assembly according to claim 2, wherein said gasket further comprises:
   opposing first and second portions adapted to be disposed between said opposing first and second periphery portions of said stack face and said opposing first and second frame portions of said dielectric insulator, respectively;
   opposing third and fourth portions adapted to be disposed between said opposing third and fourth periphery portions of said stack face and said opposing third and fourth frame portions of said dielectric insulator, respectively.

7. An assembly according to claim 6, wherein said first, second, third and fourth frame portions of said dielectric insulator include first, second, third and fourth grooves, respectively, facing the corresponding first, second, third and fourth portions of said gasket, said first, second, third and fourth portions of said gasket being adapted to be captivated by said first, second, third and fourth grooves, respectively.

8. An assembly according to claim 7, further comprising:
   one or more of said dielectric insulator, said manifold and said stack.

9. An assembly according to claim 7, wherein: a part of said fibrous ceramic layer of said third and fourth portions of said gasket, said portion of said first outer surface of the gasket and said ceramic cloth disposed on said portion of said first outer surface, are all adapted to be captivated by said third and fourth grooves, respectively; and a part of said fibrous ceramic layer of said first and second portions of said gasket are adapted to be captivated by said first and second grooves, respectively.

10. An assembly according to claim 6, wherein an interference joint is formed in a length of an inner side and spaced from an end of at least one of said opposing third and fourth portions of said gasket, each said interference joint including a notch in said length of said inner side of said at least one of said opposing third and fourth portions of said gasket followed by said length of said inner side proceeding at an angle toward the end of said at least one of said opposing third and fourth portions of said gasket.

11. An assembly according to claim 10, wherein each said interference joint further includes an end of one of said first and second portions of the gasket, said end of said one of said first and second portions of said gasket of each interference joint abutting and being angled at said angle of said length of said inner side of said at least one of said opposing third and fourth portions of said gasket forming that interference joint.

12. An assembly according to claim 11, further comprising:
one or more of said dielectric insulator, said manifold and said stack.

13. An assembly in accordance with claim 2, further comprising:
a graphite coating on the surface of said ceramic cloth opposing the surface of said ceramic cloth on said at least a portion of said second outer surface of said gasket.

14. An assembly according to claim 2, further comprising:
a ceramic rigidizer on said surface of said ceramic cloth on said at least a portion of said first outer surface of said gasket and on the surface of said ceramic cloth on said least a portion of said second outer surface of said gasket.

15. An assembly according to claim 14, further comprising a further ceramic rigidizer on a portion of said second outer surface of said gasket opposing said ceramic rigidizer on said surface of said ceramic cloth on said at least a portion of said first outer surface of the gasket.

16. An assembly according to claim 14, further comprising:
a graphite coating on the surface of said ceramic cloth opposing the surface of said ceramic cloth on said at least a portion of said second outer surface of said gasket.

17. An assembly according to claim 16, wherein:
said fibrous ceramic layer comprises at least one layer of zirconia felt;
said ceramic cloth is alumina cloth; and
said ceramic rigidizer coating comprises zirconia.

18. An assembly according to claim 17, further comprising:
one or more of said dielectric insulator, said manifold and said stack.

19. An assembly according to claim 1, further comprising:
one or more of said manifold and said stack.

20. An assembly comprising:
a gasket for sealing a manifold to a fuel cell stack, said gasket having first and second opposing outer surfaces, and a material promotive of slipping disposed on at least a portion of at least one of said first and second outer surfaces,
wherein said gasket includes a fibrous ceramic layer, and said material comprises a ceramic cloth, and
further comprising a graphite coating on a portion of the surface of said ceramic cloth opposing the surface of said ceramic cloth on said at least a portion of at least one of said first and second outer surfaces.

21. An assembly comprising:
a gasket for sealing a manifold to a fuel cell stack, said gasket having first and second opposing outer surfaces, and a material promotive of slipping disposed on at least a portion of at least one of said first and second outer surfaces,
wherein said gasket includes a fibrous ceramic layer, and said material comprises a ceramic cloth, and
further comprising a ceramic rigidizer coating on said surface of said ceramic cloth on said at least a portion of at least one of said first and second outer surfaces.

22. An assembly according to claim 21, further comprising a graphite coating on a portion of the surface of said ceramic cloth opposing the surface of said ceramic cloth on said at least a portion of at least one of said first and second outer surfaces.

23. An assembly according to claim 22, wherein:
said fibrous ceramic layer comprises at least one layer of zirconia felt;
said ceramic cloth is alumina cloth; and
said ceramic rigidizer coating comprises zirconia.

24. An assembly according to claim 23, further comprising:
one or more of said manifold and said stack.

* * * * *